United States Patent

Cruickshank et al.

[11] Patent Number: 6,121,780
[45] Date of Patent: Sep. 19, 2000

[54] MATERIAL INTERFACE LEVEL SENSING

[76] Inventors: William T. Cruickshank, 1816 N. Woodland Dr.; Norman F. Marsh, 5174 Lakeshore, both of Port Huron, Mich. 48060

[21] Appl. No.: 08/999,741

[22] Filed: Oct. 6, 1997

Related U.S. Application Data

[60] Provisional application No. 06/027,666, Oct. 7, 1996.

[51] Int. Cl.[7] .................................................. G01R 27/04
[52] U.S. Cl. .............................................. 324/643; 324/637
[58] Field of Search ................................. 324/637, 642, 324/643, 644, 646; 73/290 R, 304 R, 61.41, 61.43, 61.44, 61.61

[56] References Cited

U.S. PATENT DOCUMENTS

| | | | |
|---|---|---|---|
| 3,832,900 | 9/1974 | Ross | 73/290 R |
| 3,853,005 | 12/1974 | Schendel | 73/209 R |
| 4,135,397 | 1/1979 | Krake | 73/290 R |
| 4,345,202 | 8/1982 | Nagy et al. | 327/642 |
| 5,249,463 | 10/1993 | Willson et al. | 73/290 R |
| 5,400,651 | 3/1995 | Welch | 73/290 R |
| 5,457,990 | 10/1995 | Oswald et al. | 324/644 |
| 5,781,019 | 7/1998 | Telder | 324/643 |

*Primary Examiner*—Safet Metjahic
*Assistant Examiner*—Vincent Q. Nguyen

[57] ABSTRACT

A system for measuring the level of the interface between gasoline and water in an underground gasoline storage vessel includes an electronics enclosure from which a transmission line probe extends for contact with the gasoline and water within the vessel. The transmission line probe carries a reflection target disposed at a fixed known position with respect to the electronics enclosure, and at a position normally to be covered by the gasoline. Electronics within the enclosure employ time-domain reflectometry techniques to determine the position or level of the air/liquid surface of the gasoline, and to obtain an apparent position reflection measurement from the target disposed within the gasoline. Since the actual distance from the electronics to the reflection target, as well as from the target to the bottom of the vessel, are predetermined and known, and the level of the air/gasoline interface has been determined, the distance between the air/gasoline interface and the target is determinable, and a compensation factor related to the dielectric constant of the gasoline can be determined. Time-domain reflectometry is employed in conjunction with this compensation factor to determine the true level of the gasoline/water interface beneath the reflection target.

20 Claims, 4 Drawing Sheets

MATERIAL INTERFACE LEVEL SENSING

This application claims the benefit of provisional application Ser. No. 60/027,666 filed Oct. 7, 1996.

The present invention is directed to detection of level of material in a storage vessel, and more particularly to detection of the level of the interface between immiscible materials, such as detection of water level in a below-ground gasoline storage vessel.

BACKGROUND AND OBJECTS OF THE INVENTION

It has heretofore been proposed to employ so-called time domain reflectometry techniques to detect level of material in a storage vessel. In general, this technique involves placement of a conductive transmission line or probe in the vessel at an orientation to be contacted by material in the vessel. A microwave pulse of short duration is launched onto the transmission line probe, typically in a downward direction through air toward the material surface. When this pulse encounters an electrical impedance discontinuity, such as the change in dielectric constant at the interface between the air and material, a portion of the pulse energy is reflected back along the transmission line probe to detection electronics. Time-delayed gating techniques are employed in a process referred to as equivalent time sampling to locate the position of the reflecting discontinuity along the transmission line probe, and thereby to determine level of the material surface with respect to the probe.

Although the material level sensing technique so described has overcome problems and difficulties theretofore extant in the art, further improvements remain desirable. For example, although this conventional level detection technique is well suited for determining level of gasoline in a below-ground storage vessel at a service station or the like, a problem remains in association with detecting level of water accumulated at the bottom of the storage vessel. Conventional time delay reflectometry techniques will detect the interface between the gasoline and the water. However, because the dielectric constant of the gasoline is different from that of air, and the speed of pulse travel through the gasoline is thus slower than that in air, level of the gasoline/water interface will not be reliably measured unless compensation is made for these differences in dielectric constant and velocity. Furthermore, different grades of gasoline have different dielectric constants, and therefore different velocities of pulse travel through the gasoline layer to the gasoline/water interface.

It is a general object of the present invention to provide a system and method for measuring the position or level of the interface between immiscible materials, such as the gasoline/water interface in a below-ground gasoline storage vessel, which do not require input of gasoline dielectric constant. A more specific object of the present invention is to provide a system and method of the described character for automatically compensating the fluid interface measurement for fluid dielectric constant. A further object of the present invention is to provide a system and method of the described character that are economical to implement, and provide reliable operation over an extended operating lifetime.

SUMMARY OF THE INVENTION

A system for measuring the position or level of the interface between immiscible materials in accordance with the present invention includes a transmission line probe adapted to be positioned for contact with material in a vessel such that an impedance discontinuity is presented along the probe at the interface between the immiscible materials. Electronics are operatively coupled to one end of the probe for launching microwave energy along the probe such that a portion of such energy is reflected from the material interface. The electronics are responsive to such reflected energy portion employing time-domain reflectometry for obtaining an apparent measurement of level or position of the material interface within the vessel. A target is disposed at a predetermined position on the probe at fixed spacing from the electronics in the one immiscible material adjacent to the end of the probe to which the electronics is coupled. The electronics are responsive to portions of the microwave energy reflected from the target to compensate the apparent measurement for the velocity of propagation of the microwave energy within the one material. In one implementation of the invention for measuring the levels of gasoline and water within a storage vessel, the electronics are coupled to the upper end of the probe, and are responsive to reflected microwave energy for measuring not only the upper level of the gasoline at the air/gasoline interface, but also the level of the gasoline/water interface. In this implementation, the reflection target is disposed within the gasoline layer. In another implementation of the invention for measuring the level of oil or sludge at the bottom of a storage vessel, the electronics are coupled to the lower end of the probe, and the target is disposed adjacent to the lower end of the probe within the oil or sludge material.

A system for measuring the position or level of the interface between immiscible materials, particularly immiscible liquids such as gasoline and water, in accordance with one presently preferred embodiment of the invention includes an electronics enclosure from which a transmission line probe extends for contact with the materials in a storage vessel. The transmission line probe carries an electrical impedance discontinuity, preferably in the form of a reflection target, to be disposed at a preselected known position with respect to the electronics enclosure, and at a position normally to be covered by the upper liquid such as gasoline. Electronics within the enclosure employ otherwise conventional time domain reflectometry techniques to determine the position or level of the air/liquid surface of the upper liquid (e.g., gasoline), and to obtain an apparent position reflection measurement from the discontinuity or target disposed within the upper liquid. Since the actual distance from the electronics to the reflection target as well as the distance from the target to the vessel bottom are predetermined and known, and the level of the air/liquid interface has been determined, the distance between the air/liquid interface and the target is determinable, and a compensation factor related to dielectric constant of the upper liquid can be determined. Time delay reflectometry techniques can then be employed in conjunction with this compensation factor to determine the true level of the liquid/liquid interface—e.g., the gasoline/water interface—disposed beneath the reflection target.

Provision of the reflection target at a known distance from the electronics enclosure and the vessel bottom in the peferred embodiment of the invention thus permits compensation for changes in velocity of travel through the upper liquid due, for example, to the difference in dielectric constants between the air and the liquid. Furthermore, this compensation factor allows calculation of actual material dielectric constant, which can be employed to determine the type of liquid, such as the grade of gasoline, stored within the vessel. In the preferred embodiment of the invention, the electronics enclosure and transmission line probe are provided in a form that may be readily assembled in the field and placed within existing storage vessels, such as below-ground gasoline storage vessels. The electronics enclosure has a stub transmission line probe projecting therefrom, and additional probe length is provided in the form of elements or segments of fixed specified length, such as one-foot and two-foot lengths. An additional probe element for terminating the probe carries the reflection target, either at fixed predetermined position or at adjustable position with respect to the probe end. Following assembly of the transmission line probe to desired length, the assembly of the enclosure and probe may be lowered through a riser pipe into an existing or new below-ground gasoline storage vessel until the probe end rests on the vessel bottom, so that the reflection target is positioned at a known distance both from the electronics enclosure and the vessel bottom. Gasoline level, water level and/or gasoline grade may then be measured either by connection of the electronics to a remote display device, or by manually connecting a readout unit to an output port of the electronics enclosure within the vessel riser pipe.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
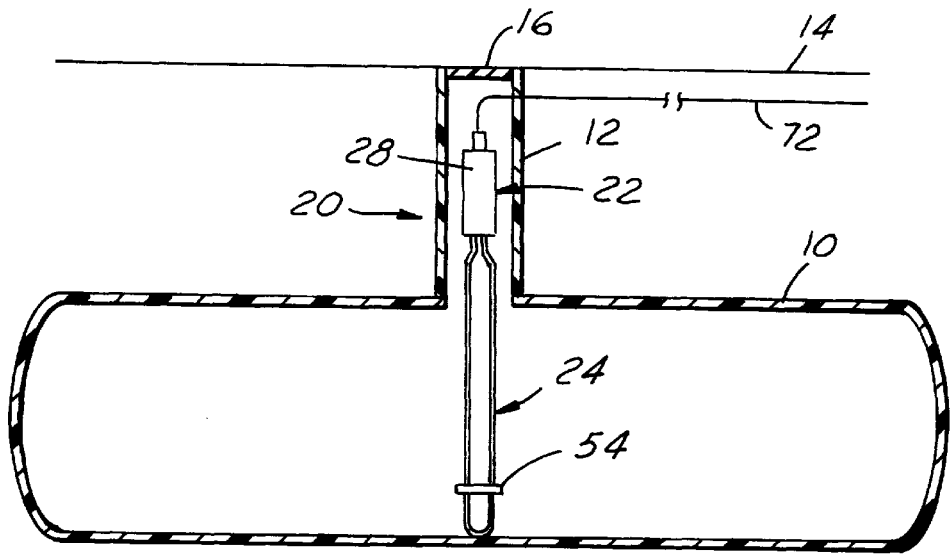
FIG. 1 is a schematic diagram of a below-ground gasoline storage vessel in sectioned side elevation, not to scale, that illustrates positioning of a level sensing system in to accordance with one presently preferred embodiment of the present invention.

FIG. 1 illustrates a below-ground gasoline storage vessel or tank 10 from which a riser pipe 12 extends to ground level 14. Riser pipe 12 is closed by a cover 16, which can be removed by an operator or service technician for access to vessel 10. There are typically a number of riser pipes 12 for any single storage vessel 10, one of which may be used for example to fill the storage vessel. Vessels 10 of the type illustrated in FIG. 1 are conventionally employed at gasoline service stations to store gasoline for dispensation to consumers. There are a number of U.S. Federal Regulations associated with such storage vessels, including for example regulations relating to leakage of gasoline from the vessel to the surrounding earth, and accumulation of water at the lower portion of the vessel. The present invention is particularly well adapted both for leak detection in accordance with inventory reconciliation techniques and determination of water level at the bottom of the vessel.

Figures 2, 2A:
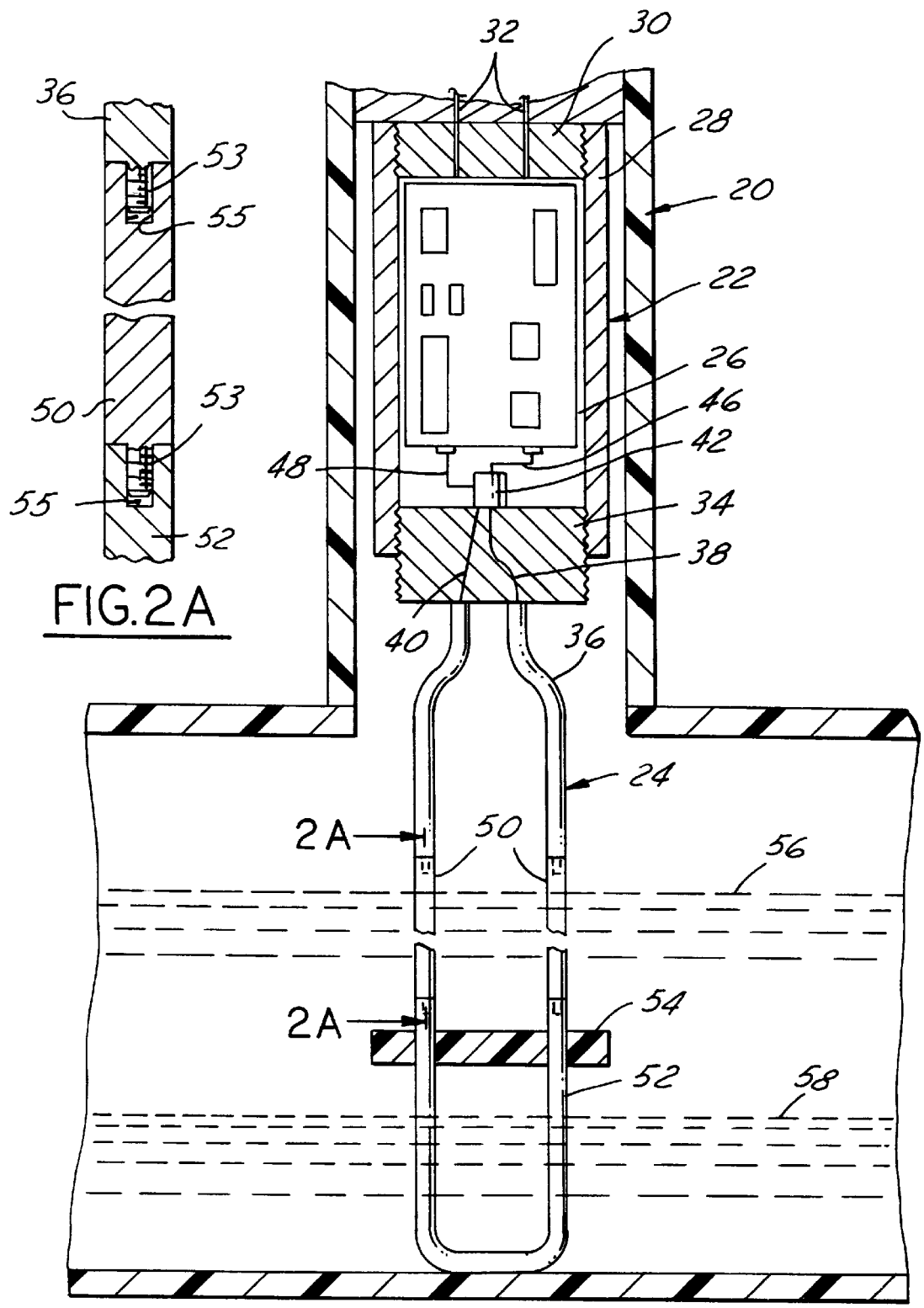
FIG. 2 is a fragmentary sectional view on an enlarged scale of the storage vessel and level detection system illustrated in FIG. 1.
FIG. 2A is fragmentary sectional view taken substantially along the line 2A—2A in FIG. 2.
Figure 3:
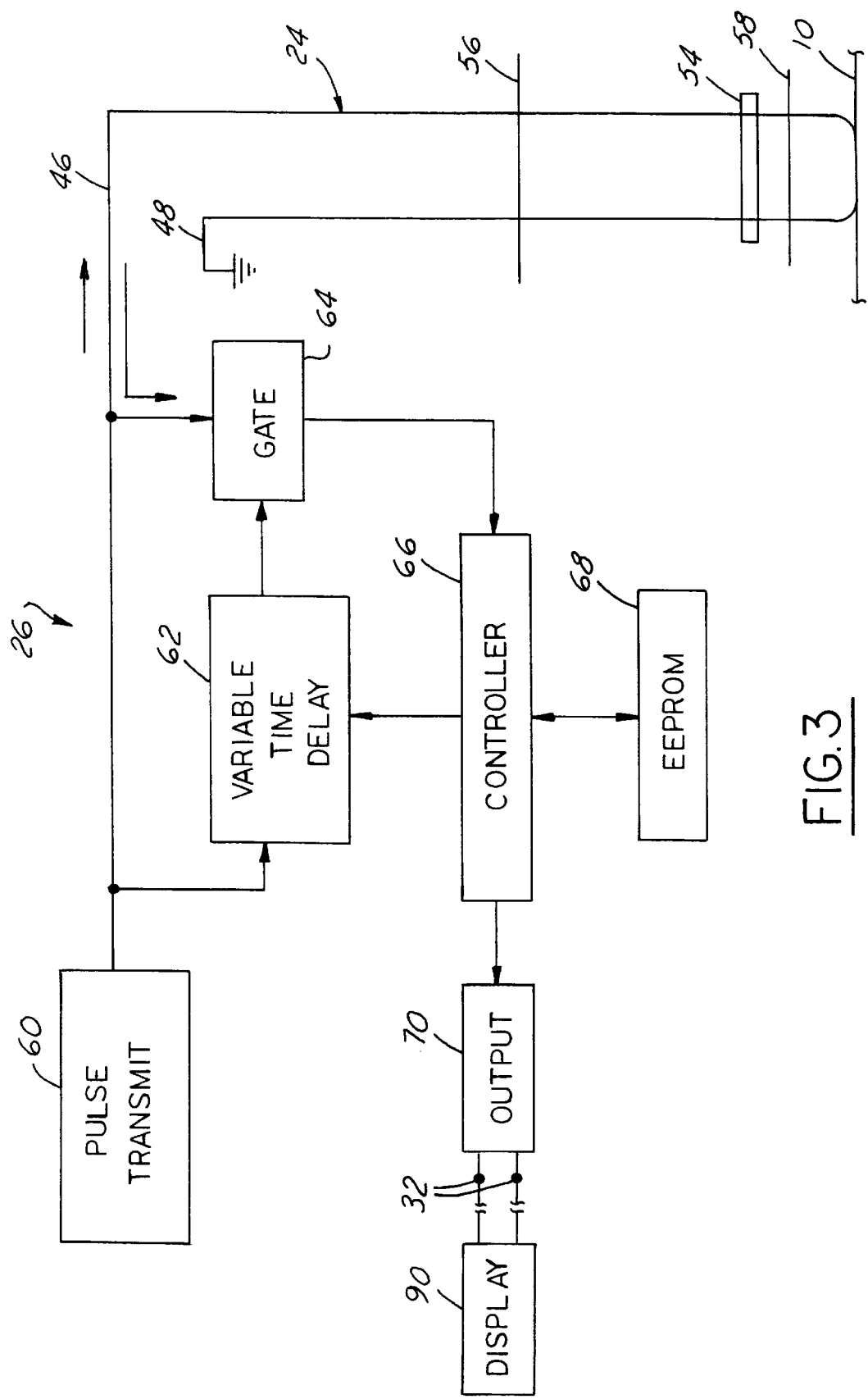
FIG. 3 is a functional block diagram of detection electronics in accordance with a presently preferred embodiment of the invention.

Referring to FIGS. 1 and 2, a level measurement system 20 in accordance with one presently preferred embodiment of the invention includes an electronics enclosure 22 from which a transmission line probe 24 extends. Enclosure 22 preferably is in the form of an electronics assembly 26 mounted within a cylindrical housing 28. A plug 30 encloses an upper end of housing 28 through which electronics 26 is connectable by means of contacts or conductors 32. The lower end of housing 28 is closed by a connector plug 34 to which a transmission line probe stub section 36 is fixedly mounted. Section 36 is connected by a pair of conductors 38, 40 to a coaxial connector 42, from which conductors 46, 48 provide connection to electronics assembly 26. As shown in FIG. 3, conductor 48 is connected to electrical ground, while conductor 46 connects transmission line probe 24 to the active components of electronics assembly 26.

Connected to probe stub section 36 and extending downwardly therefrom are a series of individual transmission line probe segments 50 of predetermined fixed lengths, such as one-foot and two-foot sections. These lengths are interconnected by means of threaded extensions 53 projecting from one probe section into threaded openings 55 on the mating probe section. The bottom or terminating section 52 is also of predetermined fixed length, such as one-foot, and carries a reflection plate 54. Plate 54 may comprise a flat section of plastic that is either affixed to or slidably positionable along terminating transmission line probe section 52. In the particular presently preferred transmission line probe construction 24 illustrated in FIGS. 1–3, the probe takes the form of a parallel line probe in which the two probe lines extend longitudinally parallel to each other throughout the vertical height of vessel 10. Spacing between the probe lines preferably is sufficient to prevent bridging of the probe by any debris within the vessel, and the individual probe lines preferably are constructed of relatively rigid metal rod stock so that spacers are not required to hold the rod lengths in position relative to each other. In the particular embodiment illustrated in FIGS. 1 and 2, spacing between the probe lines is gradually flared outwardly and downwardly from plug 34 so as to provide a gradual change in characteristic impedance between the impedance of connector 42, such as fifty ohms, and impedance along the major portion of the probe, such as two hundred ohms.

FIG. 3 is a functional block diagram of measurement electronics assembly 26. A pulse transmitter 60 is connected to transmit microwave pulses of short duration to probe 24 for reflection from electrical discontinuities along the probe, such as the interface 56 (FIGS. 1–3) between air and gasoline within vessel 10, reflection plate 54, and the interface 58 between gasoline and water within vessel 10. Pulse transmitter 60 is also connected through a variable time delay 62 to a gate 64 that also receives reflections from probe 24. The output of gate 64 is coupled to a microprocessor-based controller 66, which controls operation of variable time delay 62. Controller 66 is also connected to an EEPROM 68, which stores control programming and other control parameters and information for controller 66. Controller 66 provides an output to output circuitry 70, which may provide for example a 4–20 mA output as a function of height or level of air/gasoline interface 56 and/or gasoline/water interface 58. Output circuitry 70 is coupled to conductors 32 (FIGS. 2 and 3) at plug 30 for connection to an operator display 90 (FIGS. 3 and 8), such as by a buried cable 72 (FIG. 1) to a remote operator display and/or to the input port of a hand-held readout unit connectible by an operator to electronics 26 by removal of riser pipe cover 16 (FIG. 1).

During installation, electronics enclosure 22 with probe stub section 36 are typically preassembled at the factory, with suitable control programming prestored in EEPROM 68. Overall height of vessel 10 is either known or measured by the installation technician. The technician then assembles transmission line probe 24 by assembling suitable lengths 50 and an end section 52 to stub section 36 until the probe is of sufficient length to position enclosure 22 within riser pipe 12 while the probe end rests on the vessel bottom. Probe length is then stored in EEPROM 68, either by means of a programming device or switches on assembly 26, as is position of target 54 where the latter is variable. In situations where all vessels 10 are of the same depth and all probes 24 will be of the same length, this information may be prestored in EEPROM 68, as can position of target 54 when the latter is fixed. Where all vessels 10 are of the same height, probes 24 may be of preformed integral rather than segmented lengths. In any event, the assembled unit is then lowered into vessel 10 until probe 24 rests on the vessel bottom. Cable 72 is connected if remote display is desired, cover 16 is replaced, and the unit is ready for operation.

In operation, pulse transmitter 60 transmits periodic microwave pulses of short time duration along conductor 46 to transmission line probe 24. Variable time delay 60 is controlled by controller 66 so as to operate gate 64, and thereby monitor for reflections, for brief time intervals at progressively increasing time delays from pulse transmission. This technique, commonly referred to as equivalent time sampling, effectively divides the length of transmission line probe 24 into a multiplicity of small discreet lengths that are monitored in sequence for reflections from an electrical discontinuity. Employing this technique, a reflection will first be received from air/gasoline interface 56, from which controller 66 can determine the level of interface 56 with respect to the bottom of vessel 10 based upon the known overall length of probe 24. Operation of time delay 62 then continues until a reflection is noted from target 54. The position of target 54 with respect to the bottom of vessel 10 is fixed and known. Therefore, having determined the actual position of air/gasoline interface 56 and knowing the actual position of target 54, the time delay associated with the reflection from target 54 can be employed to compensate for the change in velocity of the microwave pulses in the surrounding gasoline as compared with the velocity of light when traveling through air. Continued operation of time delay 62 then ultimately produces a reflection from gasoline/water interface 58. Knowing and compensating for the change in velocity and dielectric constant during travel through the gasoline layer, which were determined employing target 54, the level of gasoline/water interface 58 can now be accurately determined with respect to the bottom of gasoline storage vessel 10. Controller 66 may also be programmed to perform a self-test operation in which the microcontroller continuously monitors for transmitted and return pulses, and interprets the absence of any return pulses during one cycle of time delay 62 as indicating a fault condition, such as may be associated for example with a broken transmission line probe.

Construction of target 54 in the form of a plastic plate section is presently preferred, but not critical. The important functions of target 54 are that it provide an impedance change that is detectable by the measurement electronics, and that it be positioned or positionable at a constant known distance from the electronics and the vessel bottom. It will also be appreciated that it is important to position reflection target 54 in this embodiment so as to be disposed within the upper fluid, in this case gasoline. It is presently envisioned that a reflection target 54 can be affixed to probe termination section 52 in such a way as to be ten inches above the vessel bottom when the probe rests on the vessel bottom, and thereby be well above gasoline/water interface 58 even under conditions of turbulence as might be encountered, for example, as vessel 10 is filled. Controller 66 can also be programmed automatically to follow the level of air/gasoline interface 56 as it falls, and to ignore reflections from target 54 in the event that the level of interface 56 falls below the target level.

Figure 4:
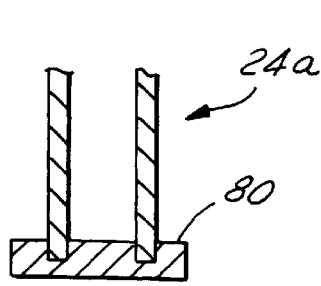
FIGS. 4–7 are fragmentary sectional views of alternative transmission line probe constructions in accordance with the present invention.
Figure 5:
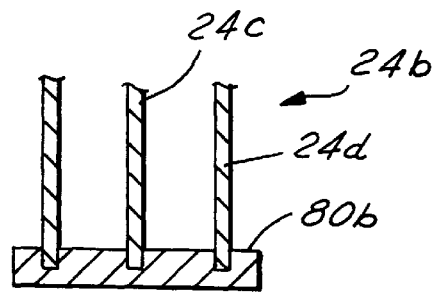
Figure 6:
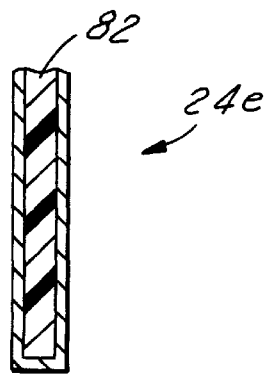
Figure 7:
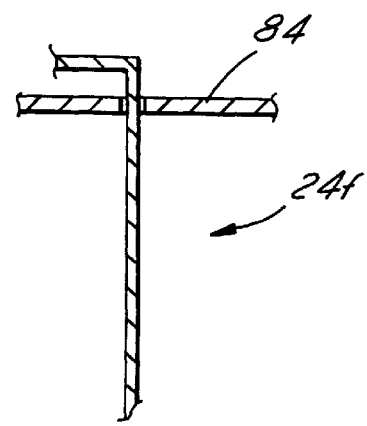

Although the present invention has thus far been described in conjunction with a presently preferred embodiment thereof, many modifications and variations may be implemented without departing from the principles of the invention in their broadest aspects. For example, although a shorted parallel-line probe 24 is currently preferred as shown in FIGS. 1–3, other probe constructions can be employed. FIG. 4 shows a modified probe construction 24a in which the parallel probe lines are shorted to each other at the bottom end by means of a removable snap-on plate 80. FIG. 5 illustrates a coaxial transmission line probe 24b that includes an inner conductor 24c surrounded by an outer conductor 24d, with the ends of the conductors 24c, 24d being shorted to each other by a snap-on plate 80b. FIG. 6 illustrates a strip-line probe 24e having parallel probe conductors deposited on opposed sides of a non-conductive base 82. FIG. 7 illustrates a single-line probe 24f, the upper end of which is surrounded by a grounded launch plate 84.

Figure 8:
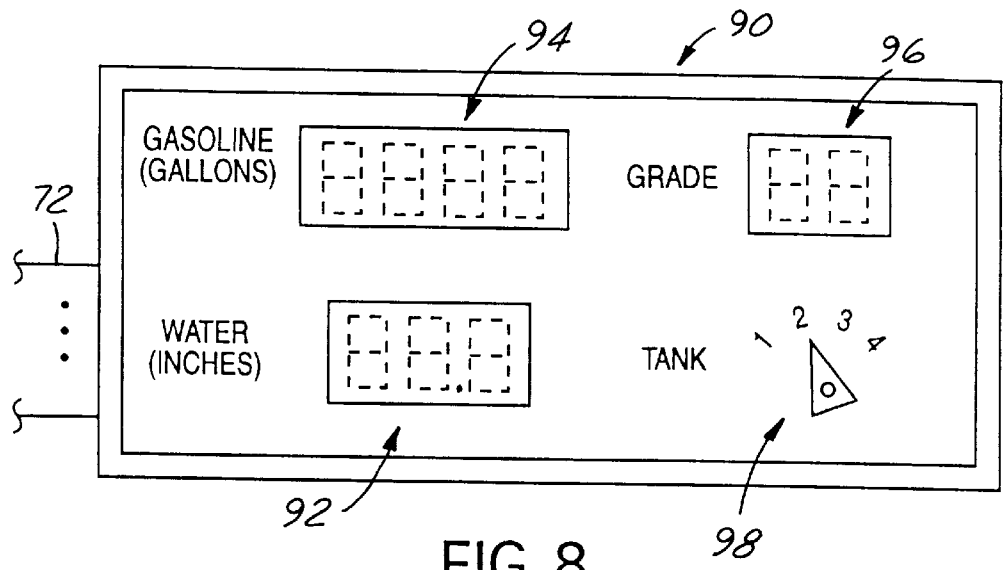
FIG. 8 is a schematic diagram of a system display in accordance with one embodiment of the invention.

FIG. 8 illustrates an operator display 90, which may be connected to electronics assembly 26 of system 20 (FIGS. 1 and 2) by means of conductor 72. Display 90, can be either located as a position remote from storage vessel 10, such as in a service station building, or may be provided in the form of a portable unit connectible to system 20 by removal of riser pipe cap 16. The particular display 90 illustrated in FIG. 8 includes a digital display 92 for displaying level of water within vessel 10, a digital display 94 for displaying quantity of gasoline, either in terms of level (subtracting the level of water) or volume in gallons (subtracting the volume of water). In order to determine gasoline volume, of course, dimensional information on vessel 10 must be prestored in display 90 (or electronics 26) for converting gasoline level to volume. Since operation of the present invention compensates for change in dielectric constant from air to gasoline by means of target 54 as previously described, the actual dielectric constant of the gasoline, and therefore the grade of gasoline, can also be determined and displayed as at digital display 96. Where display 90 is located at a remote operator building, it may be preferable to be able to connect such display to a number of level measurement systems 20 by means of corresponding cables 72, from which gasoline level/volume and grade information, and water level information, may be selectively obtained by operation of a rotary switch 98.

Figure 9:
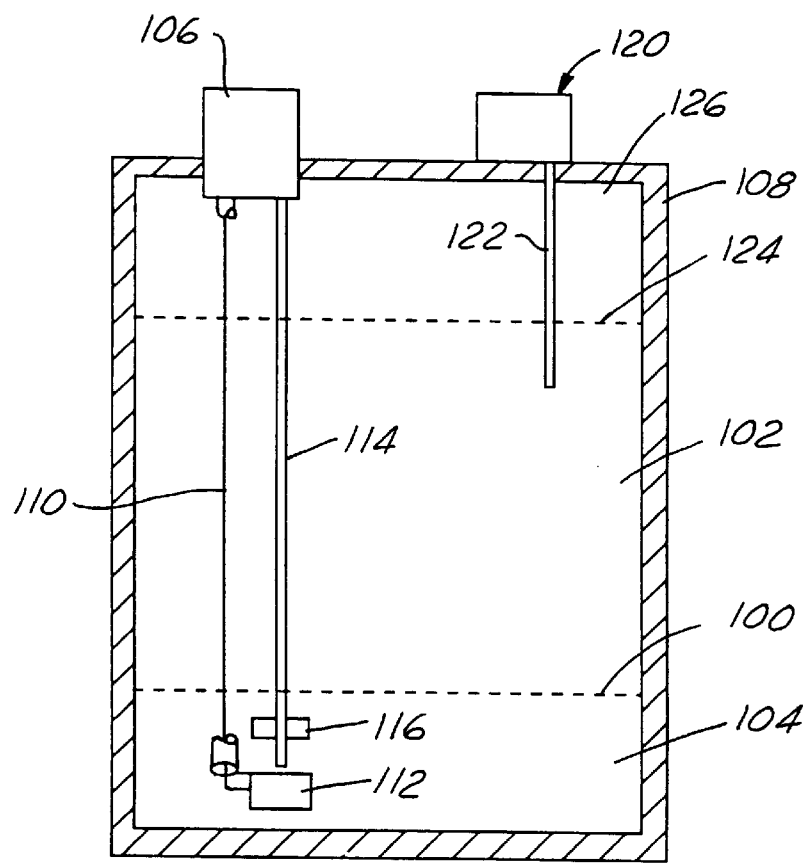
FIG. 9 is a schematic diagram of another implementation of the invention.

Although the present invention has been disclosed in connection with below-ground gasoline storage vessels, it will be recognized that the principles of the present invention are by no means limited to his particular application. Indeed, the present invention may be readily employed in conjunction with other types of immiscible liquids employed in the chemical processing industry and the like. FIG. 9 illustrates such an implementation for measuring the level of the interface 100 between water 102 and oil or sludge 104. An electronics enclosure 106 is mounted at the upper end of a storage vessel 108. The transmitter 60 (FIG. 3) within electronics enclosure 106 is connected by a coaxial cable 110 to an impedance matching element 112 at the lower end of a transmission line probe 114. The upper end of probe 114 is fastened to enclosure 106 to form an integral assembly that may be inserted through an opening at the upper end of vessel 108. A reflection target 116 is disposed adjacent to the lower end of probe 114 at fixed preselected spacing with respect to impedance matching element 112 so as always to be disposed within layer 104, and to be at fixed predetermined electrical distance or spacing from the electronics within enclosure 106. Thus, microwave radiation launched upwardly along probe 114 will be partially reflected from the impedance discontinuity presented by target 116, and partially reflected by the impedance discontinuity presented by interface 100. The known and fixed distance to target 116 can be employed as previously discussed to determine the dielectric constant of material 104, which in turn can be employed to characterize the material. Furthermore, this information can be employed to compensate for the velocity of propagation within material 104 so as to obtain a true measurement of the level of interface 100. In applications of this character, a second level measurement unit 120, including a microwave probe 122, is needed to measure the level 124 of water 102—i.e., the level of interface 124 between water 102 and air 126 within the headspace of vessel 108.

What is claimed is:

1. A system for measuring level of an interface between two immiscible materials in a vessel, which comprises:

a transmission line probe adapted to be positioned for contact with material in the vessel such that an impedance discontinuity is presented along said probe at the interface between the immiscible materials in the vessel, electronic means for operative coupling to one end of said probe, including means for launching microwave energy along said probe such that a portion of such energy is reflected from the material interface, and means responsive to such reflected energy portion employing time-domain reflectometry for obtaining an apparent measurement of level of said interface, and target means disposed at a predetermined position on said probe at fixed spacing from said electronic means in a one of said immiscible materials closer to said one end, said electronic means being responsive to portions of said microwave energy reflected from said target means to compensate said apparent measurement for velocity of said microwave energy in said one material.

2. The system set forth in claim 1 wherein said electronic means is coupled to an upper end of said probe in the vessel.

3. The system set forth in claim 1 wherein said electronic means is coupled to a lower end of said probe in the vessel.

4. The system set forth in claim 1 wherein said electronic means is responsive to said portions of said energy reflected from said target means to determine dielectric constant of said one material.

5. The system set forth in claim 4 wherein said electronic means further includes means for identifying said one material based upon said dielectric constant.

6. The system set forth in claim 5 further comprising means coupled to said electronic means and responsive to said means for identifying said one material for displaying identity of said one material.

7. The system set forth in claim 1 wherein said electronic means comprises means responsive to said reflected energy portion for measuring upper level of the material in the vessel.

8. The system set forth in claim 1 wherein said electronic means further includes means responsive to an absence of reflected energy portions for indicating a fault condition.

9. The system set forth in claim 1 wherein said transmission line probe is constructed of probe sections of incremental length.

10. The system set forth in claim 1 wherein said target means is adjustably positionable on said probe.

11. The system set forth in claim 1 wherein said electronic means includes means responsive to portions of said microwave energy reflected from said target means to determine an apparent distance to said target means, means for comparing said apparent distance to said fixed spacing, and means for correcting said apparent measurement as a function of a difference between said apparent distance and said fixed spacing.

12. A system for measuring level of an interface between upper and lower immiscible materials in a vessel, which comprises:

a transmission line probe adapted to be positioned for contact with material in the vessel such that an impedance discontinuity is presented along said probe at the interface between the immiscible materials in the vessel, electronic means coupled to an upper end of said probe, including means for launching microwave radiation along said probe such that a portion of such energy is reflected from the material interface, and means responsive to such reflected energy portion employing time-domain reflectometry for obtaining an apparent measurement of the level of said interface, and target means disposed at a predetermined position along said probe at fixed spacing from said upper end in the upper material in the vessel, said electronic means being responsive to portions of said microwave energy reflected from said target means to compensate said apparent measurement for velocity of said microwave radiation in said upper material.

13. A system for measuring level of gasoline and water in a storage vessel, which comprises:

a transmission line probe adapted to extend vertically through the vessel for contact with the gasoline and water such that a first impedance discontinuity is presented along the probe at the interface between air and gasoline, and a second impedance discontinuity is presented at the interface between the gasoline and water, electronic means coupled to an upper end of said probe, including means for launching microwave energy along said probe such that a first portion of said energy is reflected from said first impedance discontinuity and a second portion of said energy is reflected from said second discontinuity, and means responsive to said first and second reflected energy portions, employing time-domain reflectometry, for obtaining a measurement of level of said first discontinuity and apparent level of said second discontinuity, and target means disposed on said probe within the gasoline at a fixed preselected distance from said electronic means so as to present a third impedance discontinuity from which a third portion of said microwave energy is reflected, said electronic means including means responsive to said third reflected energy portion to obtain a measurement of apparent distance to said target means, means for comparing said apparent distance to said fixed preselected distance, and means for compensating said measurement of apparent level as a function of a difference between said apparent distance and said fixed preselected distance.

14. The system set forth in claim 13 wherein said electronic means includes an electronics enclosure affixed to said upper end of said probe.

15. The system set forth in claim 14 wherein said probe is constructed of sections of incremental length.

16. The system set forth in claim 15 wherein said probe includes an end section on which said target means is mounted.

17. The system set forth in claim 13 wherein said electronic means includes means for loading data into said electronic means indicative of said fixed preselected distance.

18. The system set forth in claim 13 wherein said electronic means is responsive to said difference to determine grade of gasoline.

19. The system set forth in claim 18 further including means for displaying grade of gasoline to an operator.

20. A method of measuring position of a material surface that comprises the steps of:

(a) positioning a target that reflects microwave energy at fixed position within the material, (b) directing microwave energy through the material toward and receiving reflections through the material from the target, (c) determining a property of the material based upon reflected microwave energy received in said step (b), (d) directing microwave energy through the material toward and receiving microwave energy reflected through the material from the material surface, and (e) determining position of said surface as a combined function of the reflected energy received in said step (d) and the property of the material determined in said step (c).

* * * * *